Figure 1:
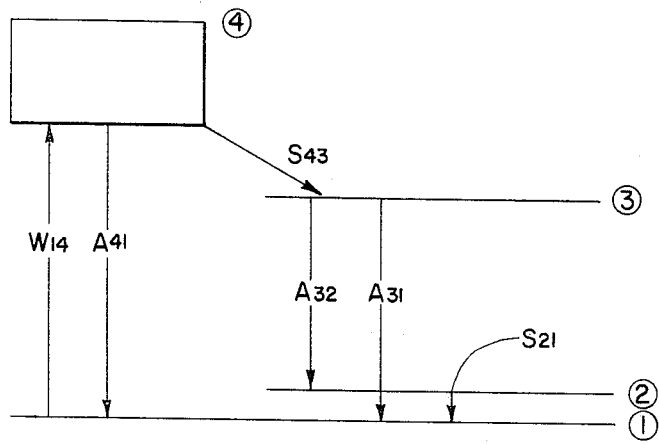

Aug. 8, 1967 A. W. HORNIG 3,335,372
ORGANIC LASER
Filed June 5, 1963

INVENTOR.
ARTHUR W. HORNIG
BY
Morse & Altman
ATTORNEYS

US Patent Office 3,335,372
Patented Aug. 8, 1967

3,335,372
ORGANIC LASER
Arthur W. Hornig, Lexington, Mass., assignor to Baird-Atomic, Inc., Cambridge, Mass., a corporation of Delaware
Filed June 5, 1963, Ser. No. 285,688
6 Claims. (Cl. 331—94.5)

The present invention relates generally to masers and more particularly comprises improvements in optical masers, sometimes referred to as lasers, which have a frequency of emission from the infra-red, through the visible, into the ultra-violet range of the spectrum. This invention is more specifically directed towards the employment of organic materials as active materials in producing stimulated coherent emission in high frequency ranges.

Masers and lasers are high frequency oscillators and amplifying devices which produce amplification by the stimulated emission of radiant energy. A solid state maser normally includes a crystal matrix having minute amounts of impurities characterized by a plurality of energy levels. In the microwave range the crystal is located in a wave guide or resonant cavity with a magnetic field applied to align electron spins in the desired direction.

A pumping signal is applied to excite spins to a higher level from which they decay, non-radiatively, to an intermediate level. As an amplifier or oscillator the intermediate level is more populated than the ground state. If the overpopulation is great enough and if the cavity is resonant at a frequency corresponding to the energy difference between the intermediate level and the ground level, than coherent oscillation may result. If the overpopulation is insufficient to cause self-oscillation, but if a signal at the oscillation frequency is introduced, this signal may be amplified in the maser.

In the solid state optical maser, the crystal preferably is given a cylindrical configuration having opposing end surfaces which are silvered or coated with dielectric strata to provide reflecting and semi-reflecting surfaces. This replaces the resonant cavity employed with a microwave frequency maser.

Maser operation is made possible by the fact that ions or molecules are characterized by various discrete energy levels. A given ion or molecule may jump from a lower energy level to a higher one by the absorption of radiation of a resonant frequency.

Normally the population distribution among the possible energy levels in a medium is governed by Boltzman's equation and, accordingly, in the system higher energy levels are less populated than lower energy levels. When electromagnetic wave energy of the frequency proper to the energy difference between two particular energy levels in accordance with Planck's equation $$f = \frac{E_2 - E_1}{h} \tag{1}$$

where $h$ is Planck's constant, is applied to the medium there will be exchange between the populations of the two levels. A certain fraction of the population in the lower level will absorb radiation and be raised to the higher level while an equal fraction of the population in the higher level will be stimulated to emit radiation and will drop to the lower level. When, as is normally the case, there is a greater population in the lower level, the results will be a net absorption of energy.

On the other hand, if there be provided a medium in which for a finite time the upper energy level is more densely populated than the lower level, there can be a net emission. An incident signal of a frequency proper to the difference in energy of these levels will, for such time, cause more power of such frequency to be radiated in phase with the incident radiation than is absorbed whereby amplification of the signal results. This is the basic principle of a maser.

Heretofore solid state optical masers have usually employed inorganic crystalline substances such as rubies in which the active impurities are chromium atoms. While these materials are well suited for masering action, they involve certain inherent limitations such as hardness, which makes it difficult to cut the crystals to the desired shape. In addition, it is difficult to grow inorganic crystals with the desired physical properties and impurity inclusions which determine the operating characteristics of the maser. Furthermore, inorganic crystals are sensitive to strains within the crystals which produce crystalline electrical fields and alter the electronic levels with the material.

Accordingly, it is an object of the present invention to provide improvements in maser devices.

Another object of this invention is to provide a maser employing a solid state active medium in the form of an organic crystal with an organic impurity.

Still another object of this invention is to provide a solid state organic maser having the characteristics of easy formation, desirable energy transfer properties, simple modification and insensitivity to internal strains.

A further object of this invention is to provide a maser device employing an organic active medium having high energy storage capabilities for the generation of high energy, electromagnetic pulses.

More particularly, this invention features a maser useful as an oscillator or as an implifier of electromagnetic energy in the infra-red, visible and ultra-violet ranges and employing an organic matrix with an organic active impurity in a single crystal form.

More particularly, this invention features an organic maser material characterized by a narrow emission line, a strong wide pumping band and an efficient intra-molecular energy transfer to the masering level. The maser material is also characterized by an efficient intermolecular energy transfer system to the active impurity from the matrix or from another impurity. This invention also features an organic maser providing high energy storage characteristics.

Figure 4:
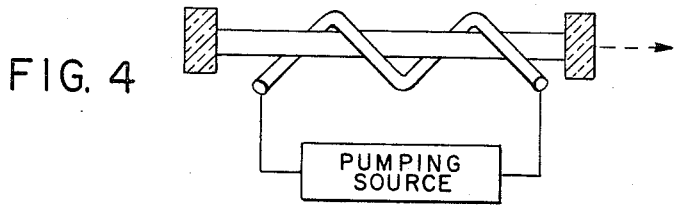
Figure 2:
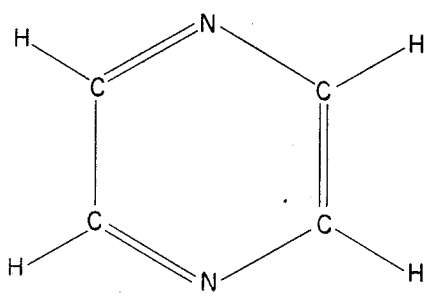
Figure 3:
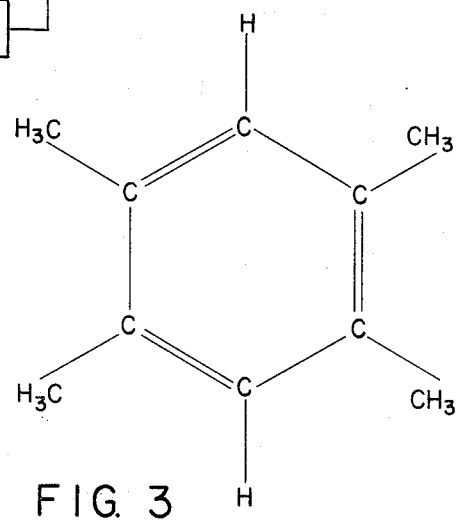

But these and other features of the invention, along with further objects and advantages thereof, will become more readily apparent from the following detailed description of the invention, taken in connection with the accompanying drawings in which;

FIG. 1 is an energy level diagram of the organic medium employed in the optical maser of my invention, FIG. 2 is a molecular diagram of the organic material pyrazine, FIG. 3 is a molecular diagram of the organic material durene, FIG. 4 is a diagram of a system for use in operating the organic material.

There are two main factors to be considered in fabricating an optical maser. The first factor involves the degree of inversion necessary for oscillation, and the second involves the ease of pumping the internal transfer of energy to the masering state. The excess inverted density necessary for oscillation is given by $$\frac{N}{V} > \frac{8\pi^2 \Delta\nu (1-R) \tau}{\lambda^2 l} \tag{2}$$

where N is the number of molecules in the excited state. V is the volume, $l$ the length of the crystal, $\Delta\nu$ is the width of the phosphorescent emission line, $\lambda$ its wave length, $\tau$ its radiative lifetime, and R the reflectivity of the ends. For a continuous optical maser the rate of pumping is also proportional to $\tau$ and this factor drops out when calculating the light intensity necessary to achieve inversion. The factors favoring easy maser action are:

(1) A narrow emission line
(2) Emission at long wave lengths
(3) A strong wide pumping band
(4) A very efficient internal energy transfer to the masering level.

Heretofore organic materials have not been considered for maser action because of the presumed width of emission lines. The complexity of the molecules and the resulting band emission due to the superposition of electronic, vibrational and rotational states made maser action unlikely.

The problem of line width in maser emission may be approached in several ways. First of all it is possible to combine some of the desirable energy transfer properties of an organic matrix with the sharp line emission properties of simple ions as in metal-organic complexes. For example, rare earth chelates are observed to have the narrow emission lines characteristic of the rare earth ions, yet these ions are excited by transfer of excitation from the triplet state of the organic host. Maser action has recently been observed in such complexes.

The second approach involves the use of an organic substance which retains a particularly narrow line spectrum of its own which may be tailored to conform to this property. An example is pyrazine whose molecular diagram appears in FIG. 2. Pyrazine is benzene with nitrogen substituted for the carbons in the 1 and 4 positions on the ring. This substance is one of the heterocyclic nitrogen ring compounds called azines. When an aromatic compound is excited to its first energy state above ground, the electron which is excited may come from the bonding $\pi$ cloud or from non-bonding S electrons localized on hetero ring members, e.g., N. In most aromatics the former excitation has the lowest energy and hence the lowest excited states are reached by so-called $\pi-\pi^*$ transitions ($\pi$ bonding to $\pi^*$ anti-bonding). Because the electron is delocalized both before and after excitation, the transition is broad. In another process the initial electron state is localized on a ring member and there is evidence that even in the excited $\pi^*$ state the electron is relatively localized. These so-called $\eta-\pi^*$ transitions ($\eta$ non-bonding to $\pi^*$ anti-bonding) are characterized by sharper lines. In the azines the first $\eta-\pi^*$ transition tends to lie below the first $\pi-\pi^*$ transition both in the singlet and triplet. The result is that the phosphorescent and fluorescent lines are now narrower and more characteristic of atomic nitrogen.

In general, two electrons occupying the same orbital must be paired, that is must have opposite spins, according to the Pauli exclusion principle. But following a transition of one electron of an original pair to a higher energy state, the spins may be opposite or alike. The former is known as a singlet state and the latter is a triplet state.

A fuller discussion of molecular energy transitions will be found in "A Symposium of Light and Life" McElroy and Gloss, 1961, The Johns Hopkins Press.

Referring now to the optical properties of pyrazine, it is known that of the diazines pyrazine has the strongest phosphorescence and therefore is ideally suited for maser applications. The lowest excited singlet state of pyrazine is reached by an $\eta-\pi^*$ transition, the absorption band extending from about 2900 to 3300 angstroms. The lifetime against fluorescence is about $10^{-6}$ seconds, while the lifetime against a radiationless transition to a triplet state is about $10^{-9}$ seconds. As a result essentially 100% of the excitation is transferred to the triplet. Fluorescence has never been observed in this material. Phosphorescence begins at about 3800 angstroms and extends to about 4250 angstroms depending upon the choice of matrix. The lifetime against phosphorescence is about $10^{-2}$ seconds. Radiationless processes from triplet to ground are negligible at low temperatures (liquid nitrogen temperatures for example).

The emission band has a prominent vibrational structure. In a hydrocarbon glass at 77° K., a vibrational band is about 200 cm.$^{-1}$ wide. In noble gases at 4.2° K. line widths are approximately 3 cm.$^{-1}$. It may be expected then that pyrazine lines will be about 10 cm.$^{-1}$ wide at 77° K. (For comparison the maser emission levels in ruby at room temperatures are about 8 cm.$^{-1}$ wide under weak excitation.)

According to the present invention the phosphorescent transition level of pyrazine is employed as the upper maser state and one or more of the ground vibrational levels as the lower level in a four level optical maser.

Durene may be employed as the matrix because its molecular structure is similar to pyrazine and because it is transparent to radiation which excites pyrazine.

Referring now to FIG. 1 of the drawings, the upper level is depicted as very wide to indicate all of the vibrational and perhaps higher electronic states excited by the pump radiation. The lifetime in any such state is short ($10^{-12}$ seconds) and it may be assumed that all excitation degrades immediately to the zero vibrational state. $A_{41}$ is the Einstein A-coefficient for spontaneous emission and accounts for the fluorescence (not observed in pyrazine). $S_{43}$ is the radiationless transition probability from singlet (4) to triplet (3). Because $S_{43}$ is greater than $A_{41}$, essentially 100% is transferred to the triplet. $A_{32}$ and $A_{31}$ are spontaneous emission coefficients which account for the observed phosphorescence. $S_{21}$ is the probability of having a radiationless vibrational transition to the ground state which is again very fast. As a result levels 1 and 2 have a Boltzman distribution.

The maser threshold for pyrazine may be determined from the following equation:

$$I(\lambda^1) \geq \frac{2\pi^2 hc\Delta\nu(1-R)}{l\lambda^2\lambda^1 K(\lambda^1)\Delta\lambda^1\eta(\lambda^1)} \qquad (3)$$

Where $I(\lambda')$ is the continuous pump intensity, $\Delta\nu$ is the fluorescent line width, $l$ the length of the crystal, $\lambda$ the fluorescent wave length, $R$ the reflectivity of the ends, $\lambda'$ the center of the absorption band, $K(\lambda')$ the absorption constant at $\lambda'$, $\Delta\lambda'$ the width of the absorption band, and $\eta(\lambda')$ the quantum efficiency for excitation at that wave length. It is assumed here that $K(\lambda')$ is relatively constant over the pumping band and small compared to $(1/r)$ where $r$ is the radius. It is also assumed that at the operating temperature (20° K.), the terminal state is empty.

The factors for pyrazine are as follows:

$\Delta\nu$—This will depend on temperature and heat. At 77° K. in a glass it is approximately 200 cm.$^{-1}$. At 4.2° K. rare gas matrices the line width is approximately 3 cm.$^{-1}$. In single crystals at 77° K. the line width is approximately 10 cm.$^{-1}$.

$\lambda$—Neglecting the (0, 0) transition to ground, the most prominent phosphorescence transitions occur at about 3800 angstroms, 3900 angstroms and 4000 angstroms with 3900 angstroms being the most intense and preferable for maser action.

$\lambda'$—In pyrazine the pump is also structured, the largest absorption being at about 3300 angstroms and preferably 3200 angstroms being used as a center.

$K(\lambda')$—This is assumed proportional to the oscillator strength $f$. For pyrazine $f=1.0\times10^{-2}$ and we may estimate that for pyrazine $K(\lambda')$ has the value 320 cm.$^{-1}$.

$\eta(\lambda')$—The phosphoresence efficiency in pyrazine in essentially 100% and at least one tenth of the phosphoresence is in a possible emission line. Therefore $\eta(\lambda')=0.1$ is assumed over all excitations.

From the above it can be determined that the continuous pump intensity $I(\lambda')\Delta\lambda'$ has as its threshold about 6.4 w. cm.$^{-2}$. This assumes a pyrazine concentration of 2% in a host such as durene. This would give a concentration of about $5 \times 10^{19}$ pyrazine molecules per cubic centimeter.

By utilizing certain organic materials with long emission lifetimes high power organic masers may be provided.

From the Equation 3 given for the threshold inversion necessary for oscillation, it follows that the stored energy is given by $$E = \frac{8\pi^2(\nu^3 \Delta \nu \tau)(1-R)hV}{lc^2} \quad (4)$$

The quantity $(\nu^3 \Delta \nu \tau)$ is a material figure of merit. Pyrazine is a material with a small $\Delta \nu$ and a relatively small $\tau$ and allows for easy pumping. To obtain high energy storage it is obvious that a large $\tau$ is very desirable along with a large $\nu$. For perdeutero naphthalene (PDN) the lifetime is about 18 seconds or about 900 times longer than pyrazine. Along with the long lifetime the phosphoresence line width in single crystals is reasonably small: 3–8 cm.$^{-1}$ at 20° K. or 20 cm.$^{-1}$ at 77° K. Emission of PDN would be in the blue and have relatively large I (as compared to ruby).

Listed below is a table in which appear the approximate values for $\Delta \nu$, $\nu^3 \tau$ and their product for various materials of interest.

| | $\nu(\times 10^{+14})$ | $\Delta \nu(\times 10^{+10})$ | $\tau$ | $\nu^3 \Delta \nu \tau (\times 10^{+52})$ |
|---|---|---|---|---|
| Sm | 4.3 | 4.8 (1.6 c.m.$^{-1}$) | $2 \times 10^{-6}$ | 0.008 |
| Cr | 4.3 | 18.0 (6 c.m.$^{-1}$) | $3 \times 10^{-3}$ | 4.3 |
| Nd (glass) | 2.8 | 600 (200 c.m.$^{-1}$) | $5 \times 10^{-4}$ | 6.0 |
| Pyrazine | 7.1 | 30 (10 c.m.$^{-1}$) | $2 \times 10^{-2}$ | 220.0 |
| PDN | 6.4 | 60 (20 c.m.$^{-1}$) | 17.6 | 270,000 |

It is clear that Nd in glass gets its high power possibilities through its broad line. Operating in the blue end of the spectrum, immediately gives an organic the advantage because of $\nu^3$.

Thus, with adequate pumping available, PDN or other related materials possess the ability for high power operation. For PDN the output is in the vicinity of 4700 angstroms, while the pumping would be at 3200 angstroms as in pyrazine.

With regard to pumping pyrazine and PDN, both materials have their first electronic absorption band centered at about 3200 angstroms. Hence the same source may be employed for both materials.

For flash pumping, the flash duration must be less than or equal to the lifetime $\tau$ for maximum pumping. In the case of pyrazine ($\tau$ equals $2 \times 10^{-2}$ seconds) a long flash should be used. In the case of PDN ($\tau$ equals 17 seconds) a quasi-continuous source would be preferable.

With sufficient pumping intensity in the 3200 angstroms region continuous pumping and operation of a pyrazine maser is possible.

With respect to pumping PDN, the preferred source is a plasma which has been seeded with Zn for example, which has strong lines in the 3300 angstrom region. In practice, this would be a quasi-continuous source which would pump throughout the long lifetime of the PDN (17 seconds).

A number of distinct advantages are made possible by employing masers in which the active medium is selected from materials having the characteristics described above. First of all, the low melting point of organic materials facilitates growing of crystals by simple laboratory processes not requiring high temperature furnaces. Also the electron levels are relatively insensitive to crystalline electrical fields and hence to strains in the crystals. This is due to the fact that most organics form molecular rather than ionic crystals. In addition, organic crystals are physically softer than inorganic crystals. This is an advantage in cutting crystals to a desired shape. The complexity of organics which produce the high multiplicity of levels also provides efficient energy transfer properties. Thus it is possible to excite the host and obtain efficient transfer of excitation to the active impurity.

One very important advantage realizable from the present invention is due to the fact that organic chemistry has developed to a high degree the technique of selective substitution on a molecule of interest. These substitutions can change the wave length intensity, width, etc. of an absorption or emission line. This factor is important since it facilitates the fabrication of a maser having selected characteristics. For example, the characteristic wavelength of benzene may be moved towards the red from the ultra-violet by the formation of additional rings. By selected substitutions and modifications a shift in wavelength may be obtained. Shifts in frequency characteristics may also be obtained by selected modifications to the matrix material. In general changes in the number and configuration of the rings will have a greater effect on changes in frequency than will substitution of atoms on the rings. Furthermore, it is a relatively simple matter to add additional impurities to the matrix for the purpose of enhancing the energy transfer characteristics of the organic crystal.

While the invention has been described with particular reference to the illustrated embodiments, it will be understood that numerous modifications will appear to those skilled in the art. Also it will be understood that the above description and accompanying drawings should be taken as illustrative of the invention and not in a limiting sense.

Having thus described the invention, what I claim and desire to obtain by Letters Patent of the United States is:

1. A maser, comprising in combination a matrix and an impurity both of organic material, said impurity being selected from the group consisting of pyrazene and perdeutero napthalene all of which are organic materials characterized by multiple energy levels and displaying a sharp transition from an excited level to a ground level, means for exciting said material from the ground state to an excited state to the extent that the populations of the higher energy levels exceed the populations of the lower energy levels and resonance means for containing said material and for sustaining oscillations at said transition frequency.

2. A maser, comprising in combination a matrix and an impurity both of organic material in single crystal form, said matrix being durene and said impurity being selected from the group consisting of pyrazene and perdeutero napthalene, said materials being characterized by multiple energy levels, said materials being further characterized by inherently sharp transitions from an excited state to a ground state, means for exciting said material from the ground state to an excited state to the extent that the populations of the higher energy levels exceed the populations of the lower energy levels and resonance means for containing said material and for sustaining oscillations at said transition frequency.

3. A maser, comprising in combination a matrix and an impurity both of organic material in single crystal form, said organic material being composed of durene and an impurity selected from the group consisting of pyrazene and perdeutero napthalene, said material being characterized by multiple energy levels including a triplet state, said material when excited displaying inherently sharp transitions from an excited triplet state to a ground state, means for exciting said material from the ground state to an excited state to the extent that the populations of the higher energy levels exceed the populations of the lower energy levels and resonance means for containing said material and for sustaining oscillations at said transition frequency.

4. A maser, comprising in combination a matrix and an impurity both of organic material in single crystal form, said organic material being composed of durene and an impurity selected from the group consisting of pyrazene and perdeutero napthalene, said material being characterized by multiple energy levels including a triplet level and a ground level, the constituted atoms of said material being joined by means of $\pi$ orbitals, said material when excited displaying inherently sharp transitions from the triplet state to the ground state, said transitions occurring as $\eta$ non-bonding to $\pi^*$ anti-bonding transitions, means for exciting said material from the ground state to an excited triplet state to the extent that the populations of the higher energy levels exceed the populations of the lower energy levels and resonance means for containing said material and for sustaining oscillations at said transition frequency.

5. A maser, comprising in combination a matrix and an impurity both of organic material in single crystal form, said organic material being composed of durene and an impurity selected from the group consisting of pyrazene and perdeutero napthalene, said material being characterized by multiple energy levels including a triplet level and a ground level, said material being further characterized by a nitrogen heterocyclical arrangement of its constituent atoms, said atoms being joined by means of $\pi$ orbitals, said material having inherently sharp transitions from triplet state to ground state, said transitions occurring as $\eta-\pi^*$ transitions, means for exciting said material from the ground state to an excited triplet state to the extent that the populations of the higher energy levels exceed the populations of the lower energy levels and resonance means for containing said material and for sustaining oscillations at said transition frequency.

6. A maser comprising in combination a matrix and an impurity in single crystal form, said organic material being composed of durene and an impurity selected from the group consisting of pyrazene and perdeutero napthalene, said material being characterized by multiple energy levels, the constituent atoms of said material being joined by means of $\pi$ orbitals, and said material having an inherently long radiative lifetime and when excited displaying a $\pi$-bonding to $\pi^*$-antibonding transition and means for exciting said material from a ground state to an excited state to the extent that the populations of the higher energy levels exceed the populations of the lower energy levels.

No references cited.

JEWELL H. PEDERSEN, *Primary Examiner.*

RONALD L. WIBERT *Examiner.*